G. A. STENSON.
AUTOMOBILE TOP.
APPLICATION FILED OCT. 5, 1916.
1,255,809.
Patented Feb. 5, 1918.
4 SHEETS—SHEET 4.
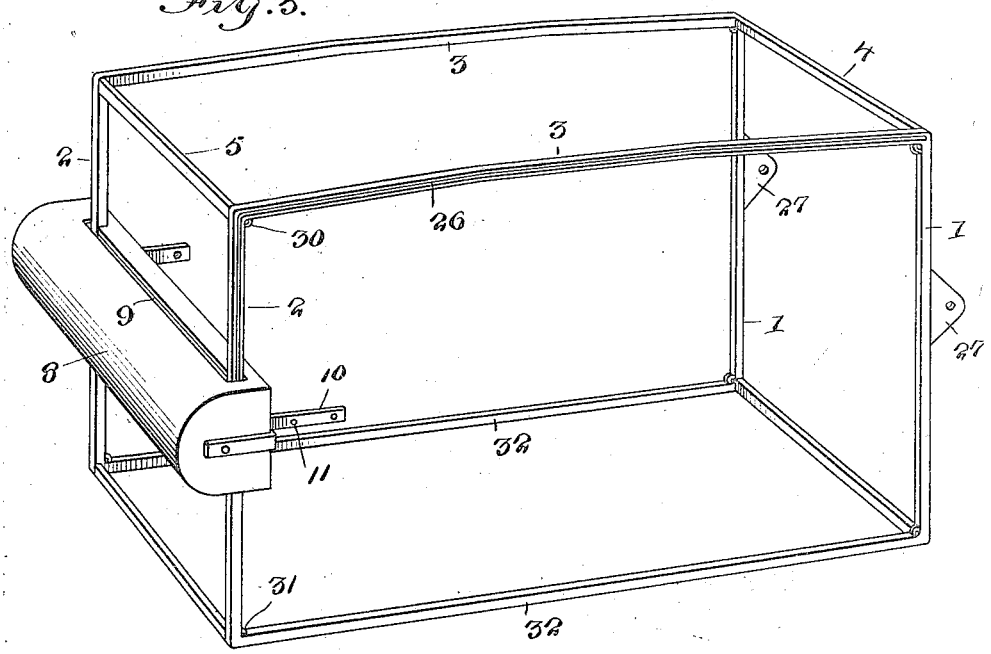
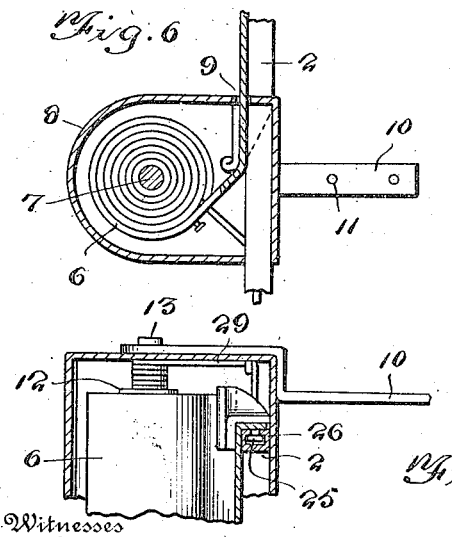
Inventor
G. A. Stenson
By Victor J. Evans
Attorney
Witnesses

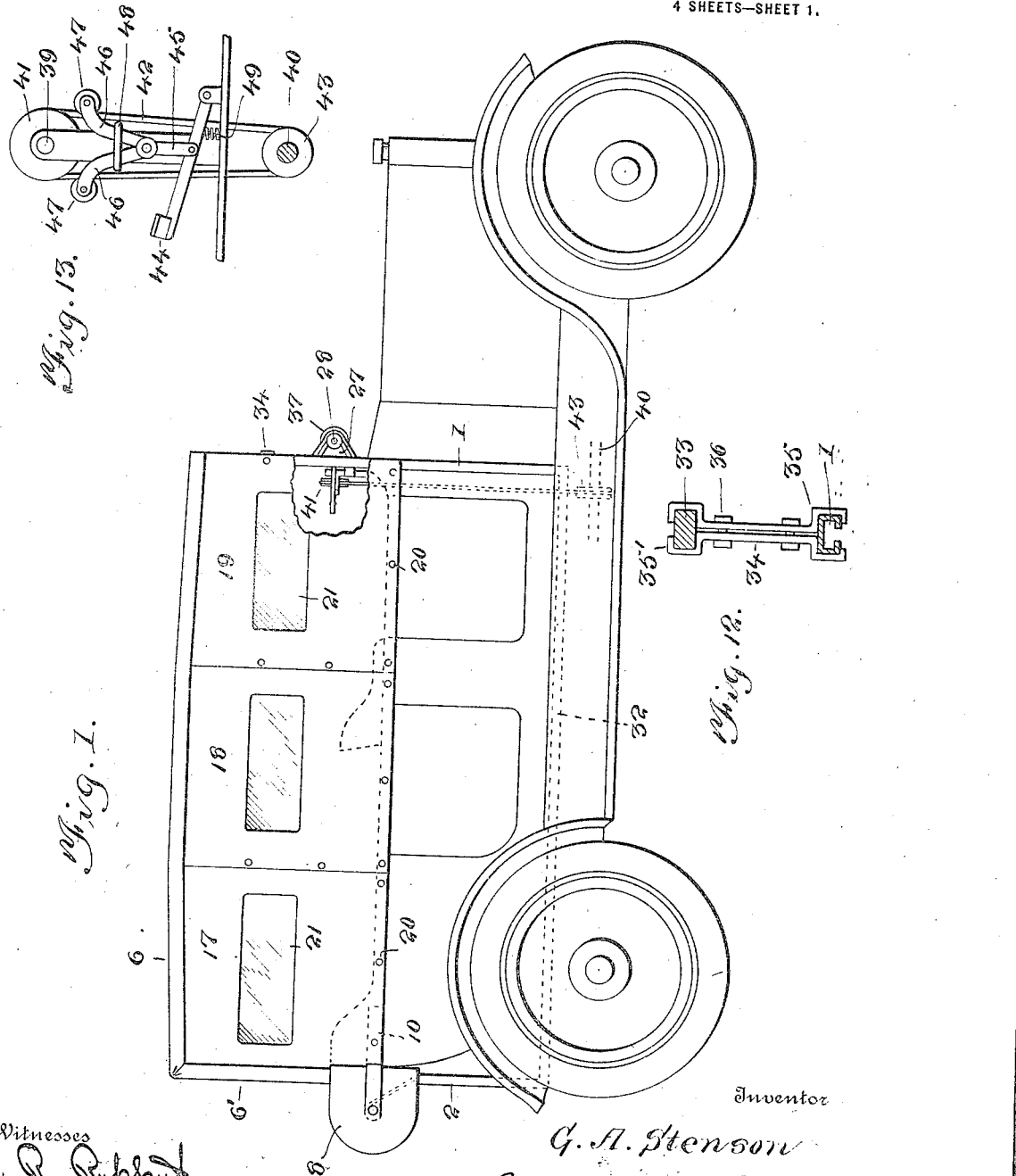

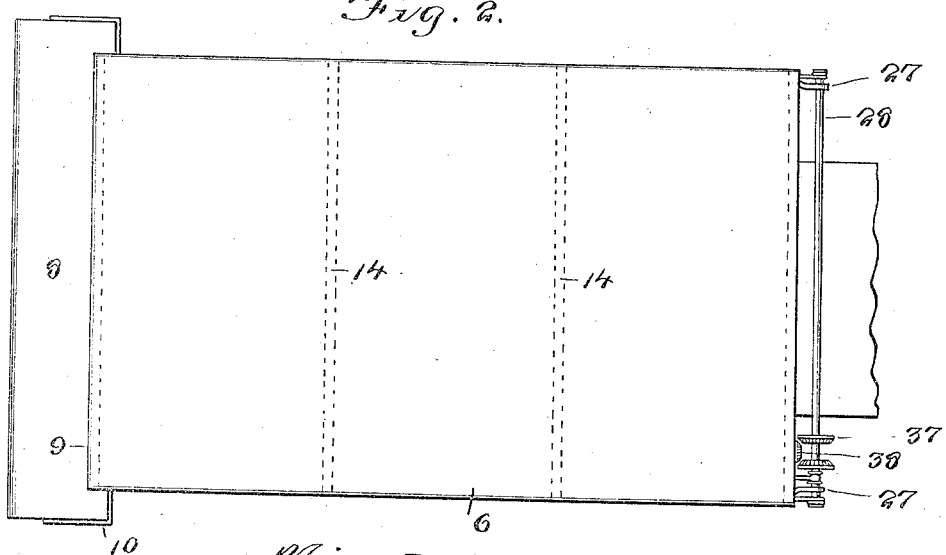
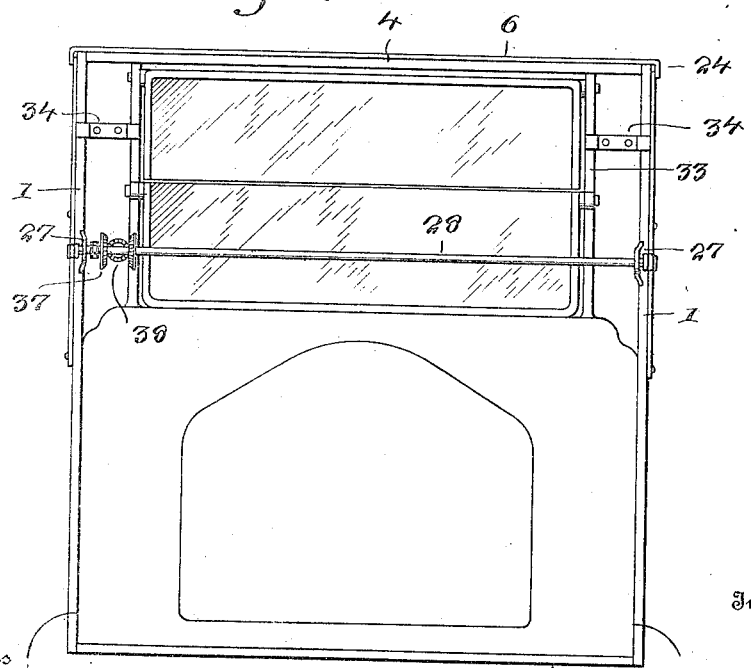

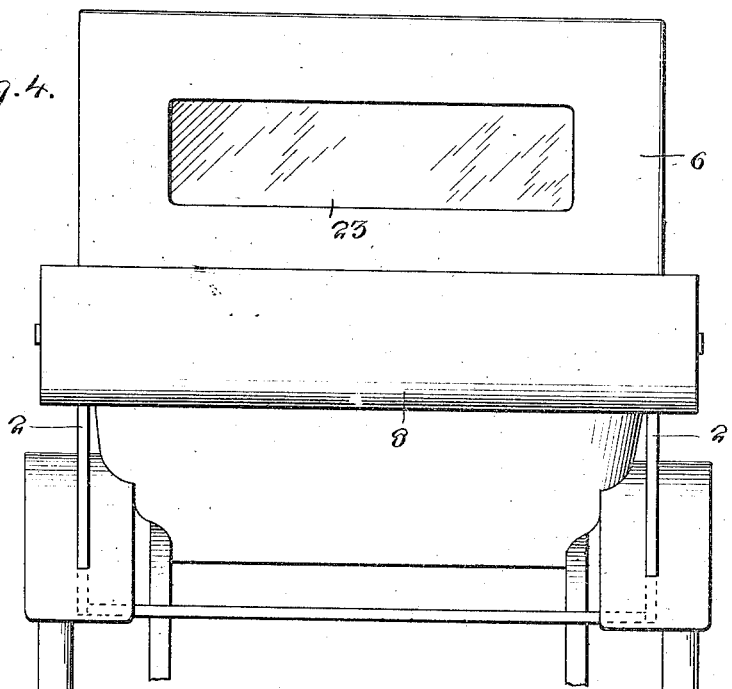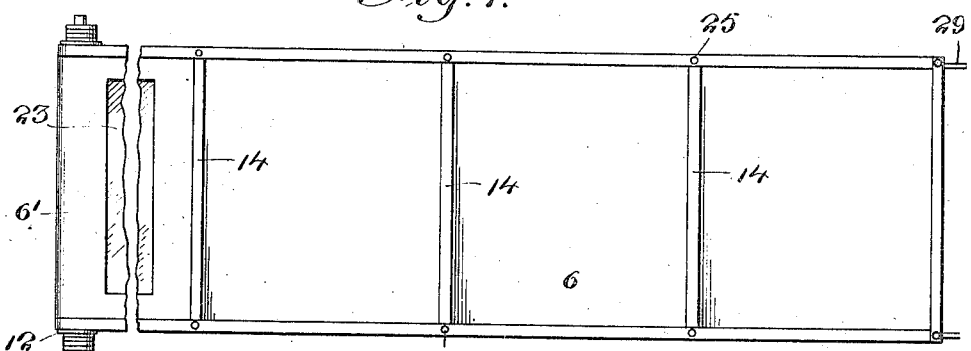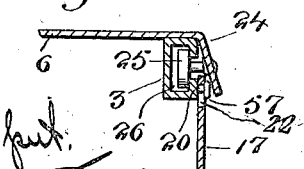

UNITED STATES PATENT OFFICE.

GUSTAF ADOLPH STENSON, OF COKATO, MINNESOTA.

AUTOMOBILE-TOP.

1,255,809.  Specification of Letters Patent.  Patented Feb. 5, 1918.

Application filed October 5, 1916. Serial No. 123,919.

*To all whom it may concern:*

Be it known that GUSTAF ADOLPH STENSON, a citizen of the United States, residing at Cokato, in the county of Wright and State of Minnesota, have invented new and useful Improvements in Automobile-Tops, of which the following is a specification.

This invention relates to automobile tops, the object in view being to produce in connection with a suitable supporting structure or frame, a flexible cover for the top of said frame or support, and means actuated by an operative element of the driving mechanism of the vehicle, whereby said cover may be withdrawn from its useful position and housed within a protective casing, and also restored to its useful position by the same means.

A further object of the invention is to combine with said cover, side curtains having such relation to the cover that they may also be housed within such protective casing simultaneously with the housing of the cover.

Another object of the invention is to produce an automobile top of the general character referred to which may be readily applied to and removed from an automobile or like vehicle, either during the process of manufacture of the vehicle or at any time subsequent thereto.

With the above and other objects in view, the invention consists in the novel construction, combination and arrangement of parts, as herein described, illustrated and claimed.

In the accompanying drawings:—

Figure 1 is a side elevation partly in section showing the present invention in its applied relation to an automobile.

Fig. 2 is a plan view of the same.

Fig. 3 is a front elevation of the automobile top, showing the cover operating mechanism.

Fig. 4 is a rear elevation of the same.

Fig. 5 is a perspective view of the frame, omitting the cover.

Fig. 6 is an enlarged fragmentary cross section through the housing which incloses the cover and side curtains when not in use.

Fig. 7 is a detail view of the cover detached.

Fig. 8 is a fragmentary plan view of the mechanism for operating the cover.

Fig. 9 is a fragmentary horizontal section through the housing adjacent to one end of the winding roller which receives the flexible top.

Fig. 10 is a fragmentary vertical transverse section showing the means for guiding the top and attaching the side curtains.

Fig. 11 is a fragmentary vertical longitudinal section showing the top cleats and the manner of housing and carrying the side curtains when not in use.

The support or frame of the top comprises the front corner uprights 1, the rear corner uprights 2 and the upper substantially horizontal frame bars 3 permanently attached at their front and rear extremities to the upper extremities of the front and rear uprights 1 and 2. The frame also comprises the front horizontal cross bar 4 and the rear horizontal cross bar 5, said cross bars respectively connecting the upper extremities of the front uprights 1 and the rear uprights 2, all of said parts being fixedly secured together under the arrangement specified.

6 designates the flexible cover designed to cover the top and rear of the frame above referred to, said cover being of leather or other flexible water proof material and the same being adapted to be wound upon and unwound from a roller 7 which is journaled in a generally cylindrical housing 8 having a longitudinal slot 9 in the top thereof through which the cover 6 passes as it is wound upon or unwound from the roller 7. The housing 8 is secured to the body of the machine by means of the forwardly extending arms 10 which are formed with holes 11 to receive fasteners, the housing 8 being thus fixedly attached to the body of the vehicle. The rear uprights 2 are connected fixedly at their lower extremities to the housing 8. The roller 7 is provided with end flanges or heads 12 between which the flexible cover 6 is wound and is extended beyond said flanges to form journals 13 which are inserted through bearings in the end walls of the housing 8.

The flexible cover 6 is provided with a plurality of cleats 14 extending transversely thereof and secured thereto. The cleats 14 are fastened to the under side of the cover 6 and each of said cleats is formed in the front and rear faces thereof with grooves 15 to receive the adjacent margins 16 of a plurality of side curtains 17, 18 and 19 each of which is provided with eyes or rings 20 along the top and bottom edges thereof, the side curtains being also shown as provided with the usual transparent panels 21 and also provided wherever necessary with holes 22 or the equivalent thereof whereby the said side curtains may be fastened in place when in their useful positions. The marginal edges of the side curtains are slidably mounted in the grooves 15 of the cross cleats 14 of the cover 6, as shown in Fig. 11, so that they may be drawn inwardly under the cover or drawn outwardly and then downwardly to their useful positions. The rear or pendent portion 6' of the cover 6 is provided with the usual transparent panel 23. The body of the cover 6 is of greater width than the length of the cleats 14 and the distance between the upper frame bars 3 and is formed with side flaps 24 extending the entire length thereof and provided with knobs or headed studs 25 at intervals along the inner side thereof, said knobs forming runners which travel in grooves 26 of T-shape in cross section while the opposite extremities of the cleats 14 slide along the top surfaces of the bars 3. The bars 3 and the rear uprights 2 are all formed with the guide ways or grooves 26 for the knobs or runners 25.

The front uprights 1 are formed with bearings lugs 27 in which is journaled a horizontally disposed front roller or shaft 28 which is driven by the engine through the medium of suitable operating mechanism hereinafter particularly described. Flexible cables 29 (see Fig. 9) are wrapped around the end portions of the shaft 28, and one end of each of said cables is attached to the forward edge of the cover 6 while the other extremity of each cable is wound around the journal portions 13 of the roller 7. Guide pulleys 30 (see Fig. 5) are arranged at suitable points on the supporting frame around which the cables 29 pass. The lower runs of the cables pass around guide pulleys 31 (see Fig. 5) below the supporting frame and lengthwise through suitable horizontal tubular frame bars or cable guides 32 which are located under the body of the machine and concealed behind the running boards with which motor vehicles are universally provided. The front uprights 1 of the supporting frame are connected to the side uprights 33 of the windshield frame by means of longitudinally split clamping yokes 34 the rear end of which is formed with a channel 35 which embraces one of the uprights 1, and the forward portion of which is formed with a channel 35' to embrace the adjacent side upright of the windshield. The sections of the split clamping yoke are fastened together by means of a bolt 36 when in their applied relation to the members 1 and 33.

The mechanism for turning the shaft 28 in either direction will now be described. Two oppositely facing bevel gears 37 are mounted on the shaft 28 and adapted to be shifted so that one or the other of said gears 37 will mesh with and drive a bevel gear 38 on a short horizontal shaft 39 extending in a fore and aft direction and parallel to but above the shaft 40 which may either constitute the engine shaft or an extension thereof. Fast on the shaft 39 is a belt wheel 41 from which a normally loose belt 42 extends around a smaller belt wheel 43 fast on the shaft 40. The belt 42 which is normally loose in relation to the wheel 43 is rendered operative by means of a belt tightener comprising a foot lever 44 to which are attached links 45 in turn attached to forks 46 which carry rollers 47 arranged at opposite sides of the belt 42 and movable through a stationary guide 48. The lever 44 is normally upheld by means of a spring 49. When the lever 44 is depressed the rollers 47 are moved toward each other thereby tightening the belt 42 and causing it to be engaged and driven by the belt wheel 43 on the shaft 40. The shaft 28 is shifted slightly in a longitudinal direction for throwing the gears 37 into and out of mesh with the gear 38 by means of a shifting fork 50 which engages a grooved collar 51 on the shaft 28. The fork 50 is pivotally mounted on an arcuate rack plate 52 and is operated by a thumb latch lever 53. The plate 52 is carried by an inwardly extending arm 54 having at its inner end a bearing 55 for the shaft 39.

It will be understood from the foregoing description taken in connection with the accompanying drawings that by operating the belt tightener by means of the foot lever 44, the belt 42 is thrown into engagement with the shaft 40 and is driven thereby. This results in driving the shaft 28 either in one direction or the other according to which of the gears 37, the gear 38 is in mesh with, and this being controlled by the lever 53 and the shifting fork 50. As the shaft or roller 28 revolves, the cables 29 are caused to move in one direction or the other and in accordance with their direction of movement, the flexible cover 6 is either wound upon the roller 7 or unwound therefrom. As soon as the cover reaches either limit of its movement, the operator releases the belt tightening lever 44 and thereby terminates the rotation of the shaft 28. When the cover is in its useful position, the side curtains may be grasped at their outer edges and drawn outwardly and downwardly and fastened in their useful positions, the eyes 20 at the upper edges of said curtains being placed in engagement with pins or hooks 57 on the upper frame bars 3 and the eyes or rings 20 at the bottom edges of said side curtains being attached to buttons, pins or hooks on the body of the machine. Before rewinding the flexible cover 6 on the roller 7 and within the housing 8, the side curtains 17, 18 and 19 are restored to their positions under the flexible cover 6 by sliding them into the grooves of the cross cleats 14. Thereupon the flexible cover together with the side curtains may be reeled upon the roller 7.

It will further be understood that the operation of moving the flexible cover to its useful position or to its housed position may be accomplished either while the machine is standing still with the engine running or while the machine is under way thus making the device as a whole very convenient in use and enabling the cover to be shifted without necessitating stoppage of the machine and consequent loss of time, and also without any appreciable physical effort on the part of the operator.

I claim:—

1. The combination with a motor vehicle, of a top frame comprising front and rear corner uprights, upper longitudinal frame bars connecting said uprights, front and rear cross bars connecting said longitudinal bars, a flexible cover, cleats on the under side of said cover having their end portions slidingly supported by said upper frame bars, a housing for said cover, a roller journaled in said housing upon which the cover is adapted to be wound and unwound, means for operating said cover to move the same to and from its useful position, said cleats being formed with guide ways in their front and rear faces, and side curtains having their marginal portions slidably received in said guide ways.

2. The combination with a motor vehicle, of a top frame comprising front and rear corner uprights, upper longitudinal frame bars connecting said uprights, front and rear cross bars connecting said longitudinal bars, a flexible cover, cleats on the under side of said cover having their end portions slidingly supported by said upper frame bars, a housing for said cover, a roller journaled in said housing upon which the cover is adapted to be wound and unwound, means for operating said cover to move the same to and from its useful position, said cleats being formed with guide ways in their front and rear faces, side curtains having their marginal portions slidably received in said guide ways, said side curtains being provided with eyes at their upper edges, and means on said upper frame bars with which said eyes may be placed in engagement.

3. The combination with a motor vehicle, of a top frame comprising front and rear corner uprights, upper longitudinal frame bars connecting said uprights, front and rear cross bars connecting said longitudinal bars, a flexible cover, cleats on the under side of said cover having their end portions slidingly supported by said upper frame bars, a housing for said cover, a roller journaled in said housing upon which the cover is adapted to be wound and unwound, means for operating said cover to move the same to and from its useful position, the rear uprights and upper frame bars being formed with channels in their outer faces, and flaps extending longitudinally of said cover and having runners on their inner faces movable along said channels.

In testimony whereof I affix my signature.

GUSTAF ADOLPH STENSON.

Witnesses:
S. A. STENSON,
A. R. JOHNSON.